United States Patent
Rico Alvarino et al.

(10) Patent No.: US 11,290,304 B2
(45) Date of Patent: Mar. 29, 2022

(54) SRS CARRIER SWITCHING WITH STTI/SPT

(71) Applicant: QUALCOMM Incorporated, San Diego, CA (US)

(72) Inventors: Alberto Rico Alvarino, San Diego, CA (US); Wanshi Chen, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/382,018

(22) Filed: Apr. 11, 2019

(65) Prior Publication Data

US 2019/0319824 A1 Oct. 17, 2019

Related U.S. Application Data

(60) Provisional application No. 62/657,552, filed on Apr. 13, 2018.

(51) Int. Cl.
*H04L 25/02* (2006.01)
*H04L 5/00* (2006.01)
(Continued)

(52) U.S. Cl.
CPC .......... *H04L 25/0226* (2013.01); *H04L 5/005* (2013.01); *H04L 5/0055* (2013.01);
(Continued)

(58) Field of Classification Search
CPC ... H04L 25/0226; H04L 5/005; H04L 5/0082; H04L 5/0055; H04L 5/001; H04L 5/0051;
(Continued)

(56) References Cited

U.S. PATENT DOCUMENTS

| 2012/0099527 A1* | 4/2012 | Ishii | H04W 72/048 370/328 |
| 2012/0257582 A1* | 10/2012 | Damnjanovic | H04L 5/0048 370/329 |
| 2017/0302419 A1* | 10/2017 | Liu | H04L 5/0082 |
| 2018/0027590 A1* | 1/2018 | Yerramalli | H04W 16/14 370/328 |

(Continued)

FOREIGN PATENT DOCUMENTS

WO WO-2017173388 A1 * 10/2017 ............ H04W 48/12
WO WO-2018005481 A1 1/2018

OTHER PUBLICATIONS

International Search Report and Written Opinion—PCT/US2019/027266—ISA/EPO—dated Jun. 24, 2019.
(Continued)

*Primary Examiner* — Kwang B Yao
*Assistant Examiner* — Syed M Bokhari
(74) *Attorney, Agent, or Firm* — Qualcomm Incorporated

(57) ABSTRACT

Sounding reference signal (SRS) carrier switching with short transmission time interval (sTTI)/short processing time (sPT) is discussed. A user equipment (UE) with aggregated communications including multiple time division duplex (TDD) downlink-only configured carriers may be triggered for sounding reference signal (SRS) carrier switching via a downlink control signal. The UE determines whether there are any other signals colliding or that may conflict with its transmission of SRS on a new carrier and resolves any apparent collision or conflict using a combination of signal, timing, or processing configuration prioritization. The SRS may be transmitted when conditions allow the UE to tune to the other carrier and tune back before any higher priority transmissions are scheduled.

28 Claims, 6 Drawing Sheets

(51) Int. Cl.
  *H04W 72/04* (2009.01)
  *H04W 8/24* (2009.01)
  *H04W 72/12* (2009.01)
(52) U.S. Cl.
  CPC .............. *H04L 5/0082* (2013.01); *H04W 8/24* (2013.01); *H04W 72/042* (2013.01); *H04W 72/0446* (2013.01); *H04W 72/0453* (2013.01); *H04W 72/1242* (2013.01)
(58) Field of Classification Search
  CPC ............ H04L 5/0053; H04W 72/0453; H04W 72/0446; H04W 8/24; H04W 72/042; H04W 72/1242; H04W 72/10; H04W 72/1205
  USPC .................................................. 370/329, 328
  See application file for complete search history.

(56) References Cited

U.S. PATENT DOCUMENTS

| 2019/0098622 | A1* | 3/2019 | Lee | H04W 72/0446 |
| 2019/0222364 | A1* | 7/2019 | Shimoda | H04L 1/1887 |
| 2020/0329471 | A1* | 10/2020 | Zhang | H04W 72/0413 |

OTHER PUBLICATIONS

Qualcomm Incorporated: "Issues for SRS Carrier Switching", 3GPP Draft; R1-1804900 Issues for SRS Carrier Switching, 3rd Generation Partnership Project (3GPP), Mobile Competence Centre, 650, Route Des Lucioles ; F-06921 Sophia-Antipolis Cedex, France, vol. RAN WG1, No. Sanya, China; Apr. 16, 2018-Apr. 20, 2018, Apr. 7, 2018 (Apr. 7, 2018), pp. 1-5, XP051414238, Retrieved from the Internet: URL: http://www.3gpp.org/ftp/tsg_ran/WG1_RL1/TSGR1_92b/Docs/ [retrieved on Jul. 4, 2018].

* cited by examiner

SRS CARRIER SWITCHING WITH STTI/SPT

CROSS-REFERENCE TO RELATED APPLICATIONS

This application claims the benefit of U.S. Provisional Patent Application No. 62/657,552, entitled, "SRS CARRIER SWITCHING WITH STTI/SPT," filed on Apr. 13, 2018, which is expressly incorporated by reference herein in its entirety.

BACKGROUND

Field

Aspects of the present disclosure relate generally to wireless communication systems and to sounding reference signal (SRS) carrier switching with short transmission time interval (sTTI)/short processing time (sPT).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving on a first carrier, by a user equipment (UE), a sounding reference signal (SRS) trigger for SRS carrier switching to a downlink-configured second carrier for an SRS transmission at a designated subframe, determining, by the UE, whether there are any additional signals scheduled for the UE to transmit on the first carrier at the designated subframe and on the first carrier at a subsequent subframe adjacent to the designated subframe, resolving, by the UE in response to detection of a first additional signal scheduled on the designated subframe, a collision between the SRS transmission and the first additional signal to identify a first scheduled transmission for the designated subframe, resolving, by the UE in response to detection of a second additional signal scheduled on the subsequent subframe, a transmission priority between the first scheduled transmission and the second additional signal, and transmitting, by the UE, one or more of the first scheduled transmission or the second additional signal according to results of the resolving.

In an additional aspect of the disclosure, an apparatus configured for wireless communication includes means for receiving on a first carrier, by a UE, a SRS trigger for SRS carrier switching to a downlink-configured second carrier for an SRS transmission at a designated subframe, means for determining, by the UE, whether there are any additional signals scheduled for the UE to transmit on the first carrier at the designated subframe and on the first carrier at a subsequent subframe adjacent to the designated subframe, means for resolving, by the UE in response to detection of a first additional signal scheduled on the designated subframe, a collision between the SRS transmission and the first additional signal to identify a first scheduled transmission for the designated subframe, means for resolving, by the UE in response to detection of a second additional signal scheduled on the subsequent subframe, a transmission priority between the first scheduled transmission and the second additional signal, and means for transmitting, by the UE, one or more of the first scheduled transmission or the second additional signal according to results of the means for resolving.

In an additional aspect of the disclosure, a non-transitory computer-readable medium having program code recorded thereon. The program code further includes code to receive on a first carrier, by a UE, a SRS trigger for SRS carrier switching to a downlink-configured second carrier for an SRS transmission at a designated subframe, code to determine, by the UE, whether there are any additional signals scheduled for the UE to transmit on the first carrier at the designated subframe and on the first carrier at a subsequent subframe adjacent to the designated subframe, code to resolve, by the UE in response to detection of a first additional signal scheduled on the designated subframe, a collision between the SRS transmission and the first additional signal to identify a first scheduled transmission for the designated subframe, code to resolve, by the UE in response to detection of a second additional signal scheduled on the subsequent subframe, a transmission priority between the first scheduled transmission and the second additional signal, and code to transmit, by the UE, one or more of the first scheduled transmission or the second additional signal according to results of execution of the code to resolve.

In an additional aspect of the disclosure, an apparatus configured for wireless communication is disclosed. The apparatus includes at least one processor, and a memory coupled to the processor. The processor is configured to receive on a first carrier, by a UE, a SRS trigger for SRS carrier switching to a downlink-configured second carrier for an SRS transmission at a designated subframe, to determine, by the UE, whether there are any additional signals scheduled for the UE to transmit on the first carrier at the designated subframe and on the first carrier at a subsequent subframe adjacent to the designated subframe, to resolve, by the UE in response to detection of a first additional signal scheduled on the designated subframe, a collision between the SRS transmission and the first additional signal to identify a first scheduled transmission for the designated subframe, to resolve, by the UE in response to detection of a second additional signal scheduled on the subsequent subframe, a transmission priority between the first scheduled transmission and the second additional signal, and to transmit, by the UE, one or more of the first scheduled transmission or the second additional signal according to results of execution of the configuration to resolve.

In an additional aspect of the disclosure, a method of wireless communication includes receiving, by a UE, an SRS trigger for SRS carrier switching from a first carrier to a downlink-configured second carrier for an SRS transmission at a designated subframe, determining, by the UE, whether there are any additional signals scheduled for the UE to transmit on the first carrier that overlap with the SRS transmission, resolving, by the UE in response to detection of a first additional signal scheduled on the designated subframe, a collision between the SRS transmission and the first additional signal to identify a first scheduled transmission for the designated subframe, and transmitting, by the UE, one or more of the SRS transmission or the first additional signal according to results of the resolving.

In an additional aspect of the disclosure, an apparatus configured for wireless communication includes means for receiving, by a UE, an SRS trigger for SRS carrier switching from a first carrier to a downlink-configured second carrier for an SRS transmission at a designated subframe, means for determining, by the UE, whether there are any additional signals scheduled for the UE to transmit on the first carrier that overlap with the SRS transmission, means for resolving, by the UE in response to detection of a first additional signal scheduled on the designated subframe, a collision between the SRS transmission and the first additional signal to identify a first scheduled transmission for the designated subframe, and means for transmitting, by the UE, one or more of the SRS transmission or the first additional signal according to results of the resolving.

In an additional aspect of the disclosure, a non-transitory computer-readable medium having program code recorded thereon. The program code further includes code to receive, by a UE, an SRS trigger for SRS carrier switching from a first carrier to a downlink-configured second carrier for an SRS transmission at a designated subframe, code to determine, by the UE, whether there are any additional signals scheduled for the UE to transmit on the first carrier that overlap with the SRS transmission, code to resolve, by the UE in response to detection of a first additional signal scheduled on the designated subframe, a collision between the SRS transmission and the first additional signal to identify a first scheduled transmission for the designated subframe, and code to transmit, by the UE, one or more of the SRS transmission or the first additional signal according to results of the resolving.

In an additional aspect of the disclosure, an apparatus configured for wireless communication is disclosed. The apparatus includes at least one processor, and a memory coupled to the processor. The processor is configured to receive, by a UE, an SRS trigger for SRS carrier switching from a first carrier to a downlink-configured second carrier for an SRS transmission at a designated subframe, to determine, by the UE, whether there are any additional signals scheduled for the UE to transmit on the first carrier that overlap with the SRS transmission, to resolve, by the UE in response to detection of a first additional signal scheduled on the designated subframe, a collision between the SRS transmission and the first additional signal to identify a first scheduled transmission for the designated subframe, and to transmit, by the UE, one or more of the SRS transmission or the first additional signal according to results of the resolving.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
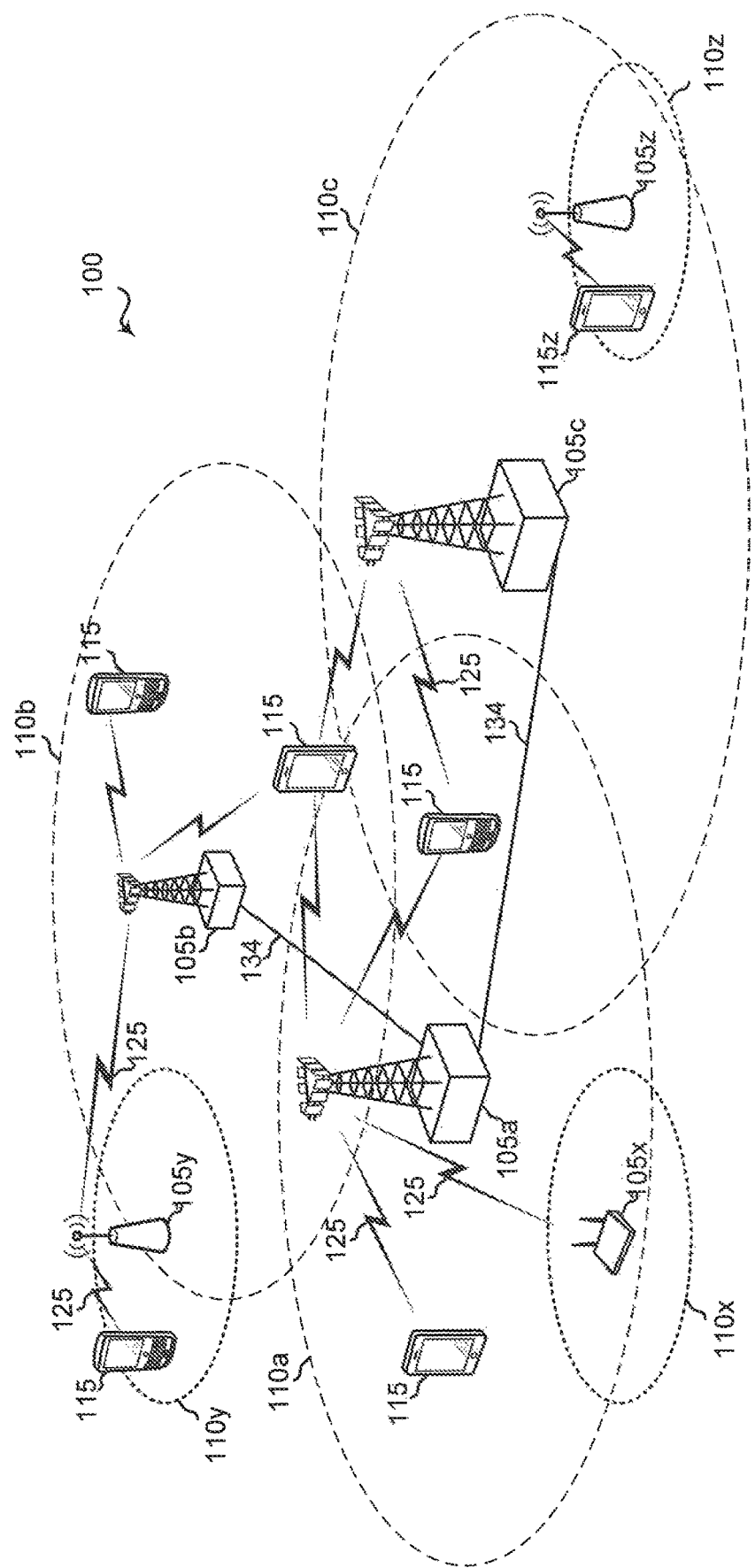
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
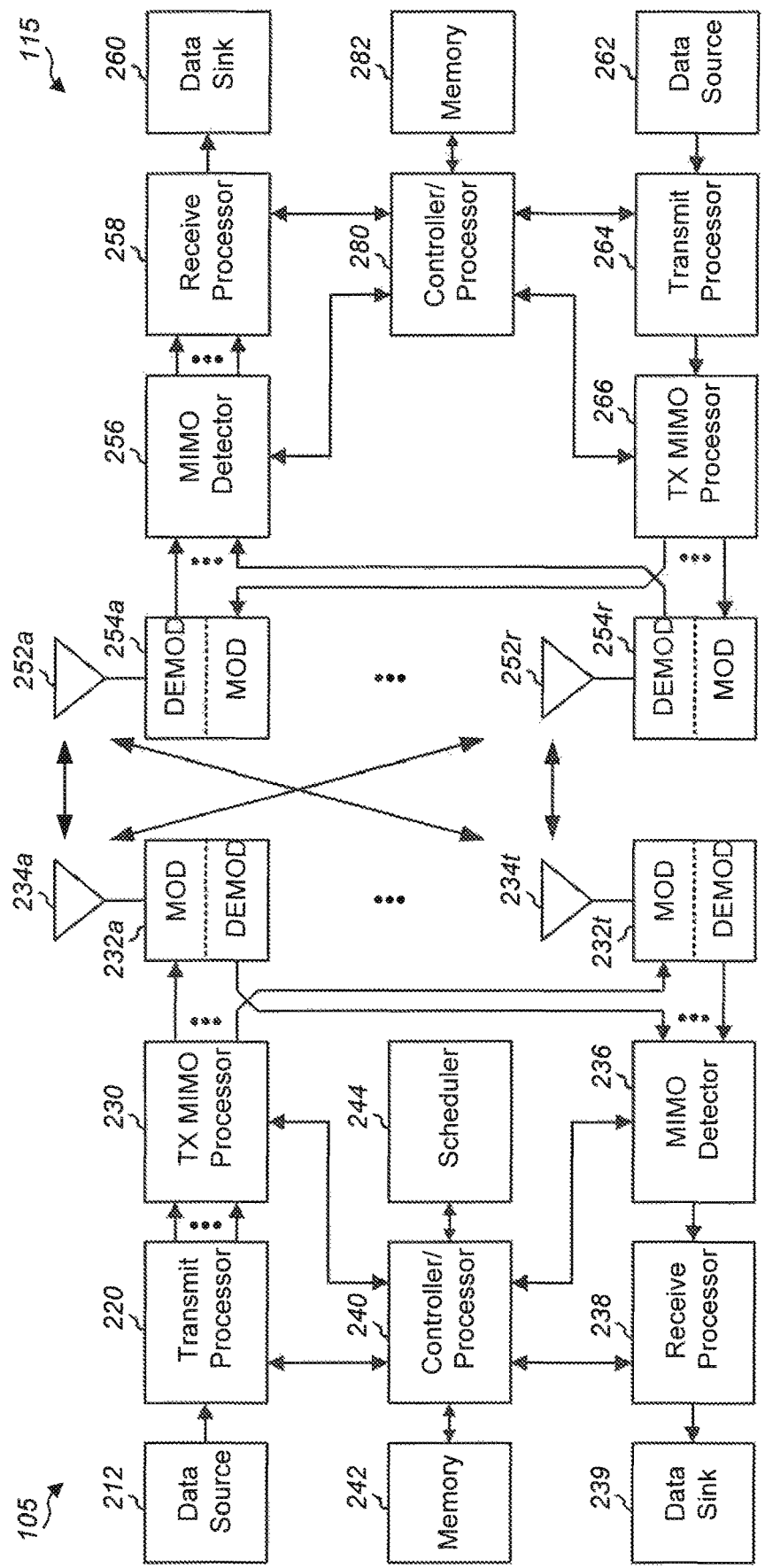
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 3, and/or other processes for the techniques described herein. The memories 242 and 282 may store data and program codes for the eNB 105 and the UE 115, respectively. A scheduler 244 may schedule UEs for data transmission on the downlink and/or uplink.

In advanced versions of LTE, SRS carrier switching allows the ability for a UE to transmit sound reference signals (SRS) in a time division duplex (TDD) secondary cell (SCell) for which there is no uplink configured. In LTE deployments, there may be more downlink-only carriers configured for communications. Thus, some carriers may only be configured for downlink communications. Because downlink and uplink carriers are reciprocal in TDD cells, it may be helpful for channel estimation to configure the UE to transmit SRS on such a TDD cell (referred to herein as a "SRS-SCell" or a "TDD serving cell without PUSCH/PUCCH transmission") configured only for downlink. The SRS may be used for beamforming or channel estimation of the configured downlink channel due to the reciprocal relationship. The UE may switch or retune one of its radio frequency (RF) transmit chains to the SRS-SCell, which creates an interruption in a different SCell/PCell for the switched SRS transmission.

SRS carrier switching may be triggered either via the downlink configured SCell or through the common search space (CSS) of a primary cell (PCell). In some cases (e.g. dual connectivity), the primary cell may be a primary SCell (pSCell). Moreover, the triggering signal in the CSS of the PCell may take the form of a group triggering signal (e.g., group DCI, DCI format 3B), which triggers SRS carrier switching for a group of UEs and/or a group of carriers for at least one UE. The interruptions/prioritizations of transmissions of the UE may depend on both the information sent on the cell that will be interrupted (the "source cell") as well as whether the SRS is requested as an asynchronous SRS (A-SRS) or periodic SRS (P-SRS). The UE reports the interruption time to retune from the band A carrier to the band B carrier. Example interruption times may be up to 0.5 ms, but more relaxed interruption times may be allowed, such allowing for dropping such transmissions up to 2 ms before and 2 ms after the UE switches to the target SCell.

Additional advanced networks have introduced the timing capabilities of short transmit time interval (sTTI) and short processing time (sPT). The concepts of sTTI and sPT operate to reduce the timeline of communications. For example, sTTI may reduce the timeline and length of the TTI to sub-slot or slot timing. Thus, sTTI timing may provide transmission units on a per slot basis or even smaller basis, such as on a ⅔ OFDM-symbol sub-slot scheduling. Thus, for a standard subframe, there may be up to six transmission units (e.g., with the ⅔ OFDM-symbol sub-slot scheduling).

While sTTI/sPT work on a faster timescale, SRS carrier switching relies on RF retuning procedures that may operate on a slower timescale. Thus, in order to compute the collision handling rules that may arise with SRS carrier switching for operations that may be configured with sTTI/sPT, the UE may perform a "look ahead" operation, in which, for example, the decision to transmit SRS in subframe N may depend on the data to be transmitted in subframe N+1.

The current standard timeline allows for a 2 ms interruption before transmitting SRS. Considering that a slot-based sTTI has an "N+4" timing for SRS, such that a grant received in slot N will trigger transmission of the SRS at slot N+4, there would be 1.5 ms to compute any switching times, reconfigure the RF, etc. A UE, thus, may not have enough time to process all this information before switching carriers, even though the RF switching time may be the same as for a standard, 1 ms TTI. Additionally, while a UE may be processing a DCI more quickly in one carrier, it may then receive a DCI on another carrier that is configured for slower timing. The two carriers are coupled together for the SRS carrier switching, but because of the discrepancies of the timing between the two carriers there may be issues coordinating operations on both carriers.

It should be noted that the "interruption time" may be defined herein as the time during which the UE cannot transmit or receive on the "source cell." However, before the defined interruption time, the UE would process a set of items (e.g. power amplifier (PA) loading, retuning parameters, etc.). Thus, the effective interruption time may be much greater than simply the time while the UE can neither transmit nor receive.

Figure 3:
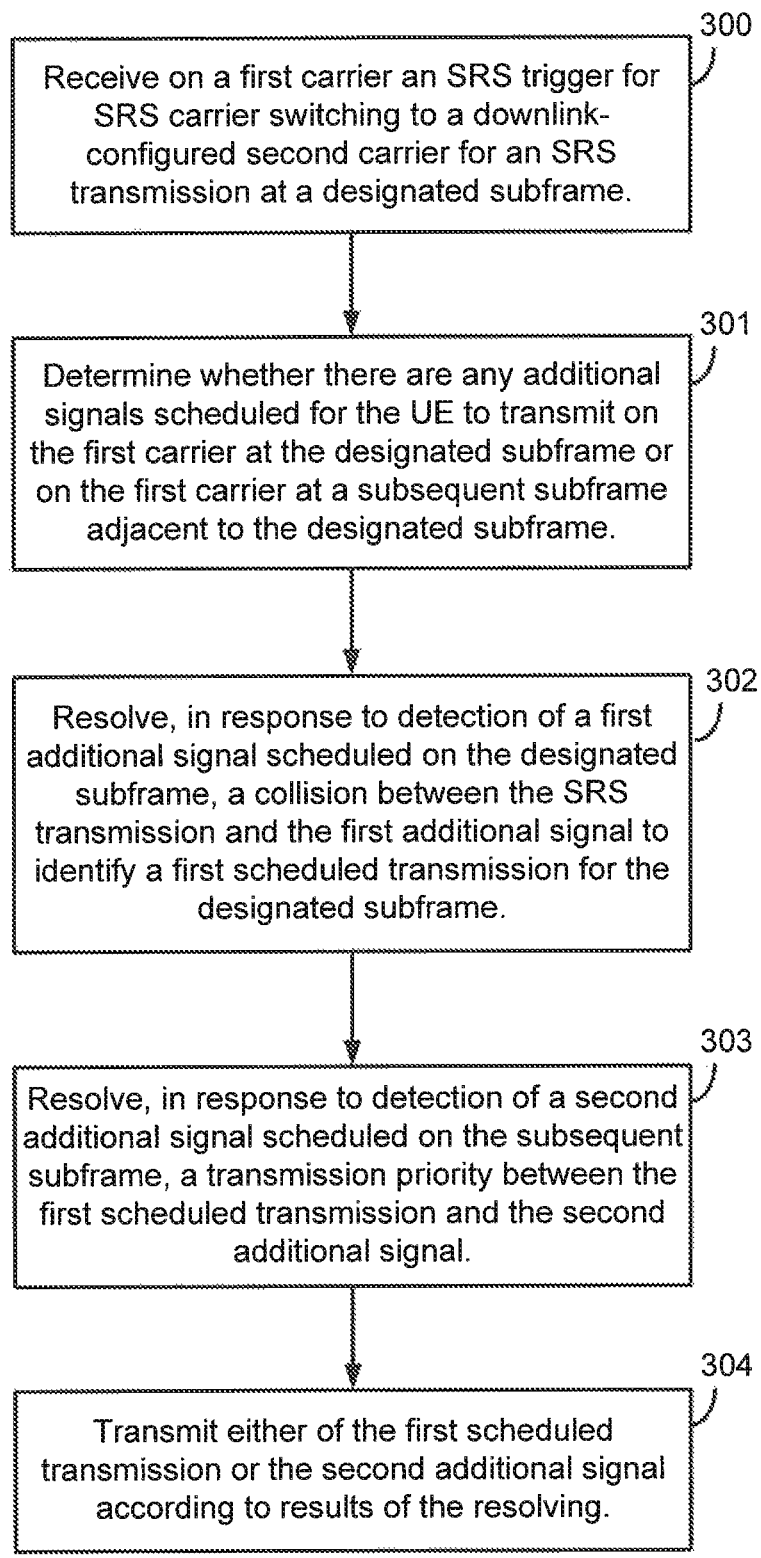
FIG. 3 is a block diagram illustrating example blocks executed to implement one aspect of the present disclosure.
Figure 6:
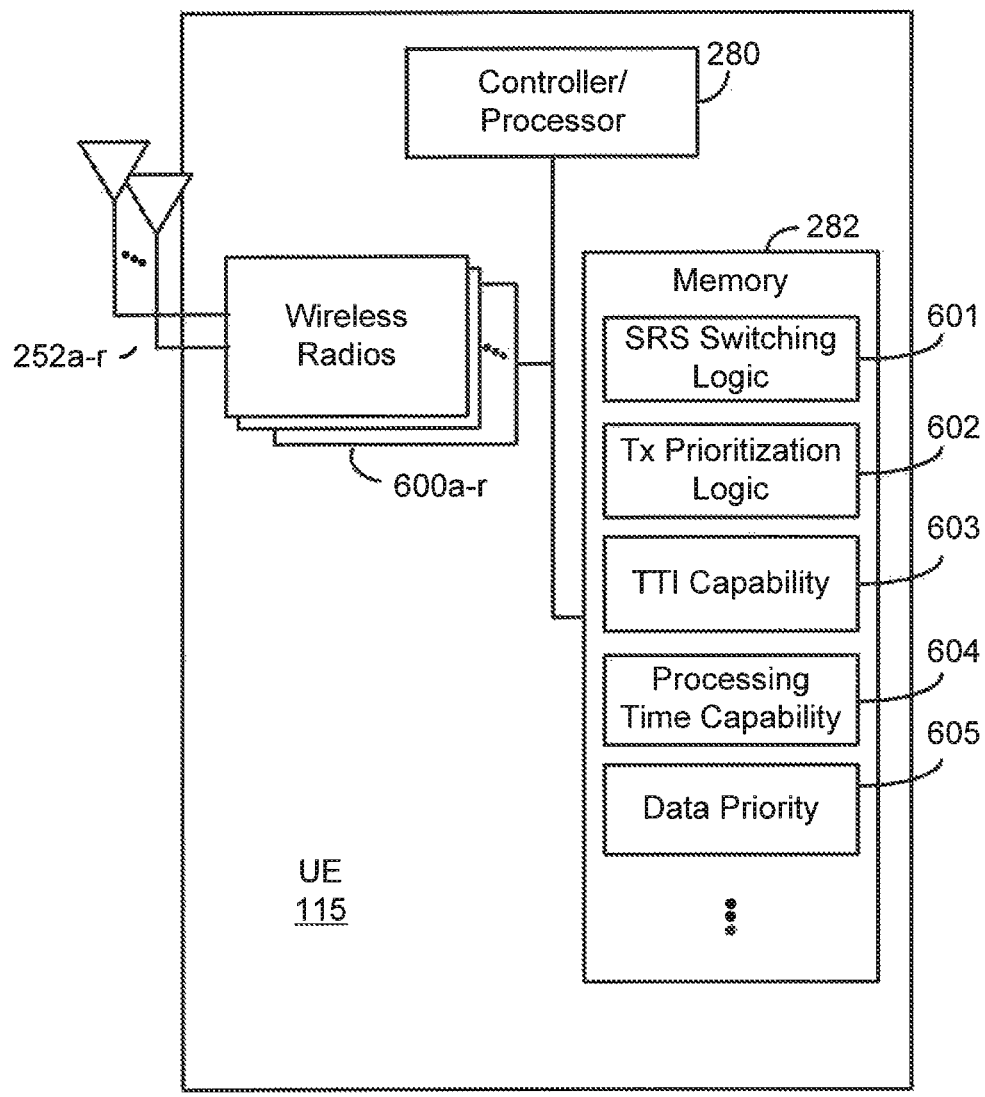
FIG. 6 is a block diagram illustrating a UE configured according to one aspect of the present disclosure.

FIG. 3 is a block diagram illustrating example blocks executed to implement one aspect of the present disclosure. The example blocks will also be described with respect to UE 115 as illustrated in FIG. 6. FIG. 6 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 600a-r and antennas 252a-r. Wireless radios 600a-r includes various components and hardware, as illustrated in FIG. 2 for UE 115, including modulator/demodulators 254a-r, MIMO detector 256, receive processor 258, transmit processor 264, and TX MIMO processor 266.

At block 300, a UE receives, on a first carrier, an SRS trigger for SRS carrier switching to a downlink-configured second carrier for an SRS transmission at a designated subframe. The UE, such as UE 115, may receive the SRS trigger via antennas 252a-r and wireless radios 600a-r. The SRS trigger may be received in a downlink control signal in the common search space (CSS) of a PCell, or in a UE-specific search space of an SRS-SCell.

At block 301, the UE determines whether there are any additional signals scheduled for the UE to transmit on the first carrier at the designated subframe and on the first carrier at a subsequent subframe adjacent to the designated subframe. In order to execute the SRS carrier switching, upon receiving the trigger, UE 115, under control of controller/processor 280, executes SRS switching logic 601, stored in memory 282. The execution environment of SRS switching logic 601 allows for UE 115 to look ahead to the designated subframe and its adjacent subsequent subframe to determine whether there are any additional signals for UE 115 to transmit. UE 115 may identify colliding signals for transmission in the designated subframe and/or additional signals scheduled for transmission in the subsequent subframe which may impact the decision to perform the SRS carrier switching for SRS transmission in the designated subframe or not.

At block 302, the UE, in response to detection of a first additional signal scheduled on the designated subframe, resolves a collision between the SRS transmission and the first additional signal to identify a first scheduled transmission for the designated subframe. If a colliding signal is detected in the designated subframe, UE 115 accesses transmission prioritization logic 602, stored in memory 282. UE 115 compares the priority of the SRS transmission with the signal scheduled at the designated subframe to identify the first transmission to schedule for the designated subframe (the "first scheduled transmission"). As noted further below, the priority may be applied according to the following relation:

$$CQI < SRS < HARQ\text{-}ACK. \quad (1)$$

Currently, the priority rules depend mainly on the type of transmission (e.g., HARQ-ACK, CQI, etc.) Aspects of the present disclosure provide for resolving collisions by prioritizing SRS switching or transmission in source cell also depending on the TTI length and/or HARQ scheduling time. For example when a standard 1 ms PUSCH collides with SRS, UE 115 may drop the PUSCH, but if UE 115 accesses TTI capability 603 and identifies that the collision is between an sTTI PUSCH and SRS, UE 115 may drop SRS. Thus, the rules for resolving the collisions may be different depending on whether UE 115 operates in standard TTI (N+4 timing) or sTTI (N+3 timing). Transmit prioritization logic 602 may include such rules for resolving collision in consideration of the TTI mode configured for operation.

In an additional and/or alternative aspect of the present disclosure, the rules for resolving collisions may also depend on whether the data carried over the sTTI is marked as high reliability (e.g., URLLC). In implementation of such an aspect, UE 115 accesses data priority 605 to determine the priority of the data for transmission over the sTTI. UE 115 may identify the logic channel identifier (LCID), which may provide the data quality requirements for transmission on the logical channel. In some cases, UE 115 may identify a physical layer identifier (e.g. RNTI, field in DCI, DCI format used for scheduling, search space, etc.) associated with the URLLC traffic to determine the data priority. UE 115 notes this data priority in memory 282 at data priority 605.

At block 303, the UE, in response to detection of a second additional signal scheduled on the subsequent subframe, resolves a transmission priority between the first scheduled transmission and the second additional signal. At block 304, the UE transmits either the first scheduled transmission or the second additional signal according to results of the resolving. If UE 115 detects an additional signal scheduled for transmission in the subsequent subframe, UE 115 again identifies the transmission priority between the two signals as provided in transmission prioritization logic 602. If the first scheduled transmission has priority over the second additional signal, then UE 115 would drop transmission of the second additional signal if the first scheduled transmission is the SRS transmission or transmit both signals if the first scheduled transmission is the first additional signal. However, if the second additional signal has priority over the first scheduled transmission, then, when the first scheduled transmission is the first additional signal, UE 115 may either transmit both first and second additional signals, as scheduled, or simply transmit the second additional signal. But, when the first scheduled transmission is the SRS signal, then, depending on whether UE 115 has already switched carriers, UE 115 checks processing time capability 604 to determine whether it is capable of sPT. If so, then UE 115 may switch back to the first carrier and transmit the first additional signal before transmitting the second additional signal. If UE 115 cannot perform sPT, UE 115 would switch back to the first carrier, drop transmission of the first additional signal, as there would not be sufficient time to switch back to the first carrier to transmit the first additional signal at the designated subframe. UE 115 would, instead, only transmit the second additional signal at the subsequent subframe.

Figure 4:
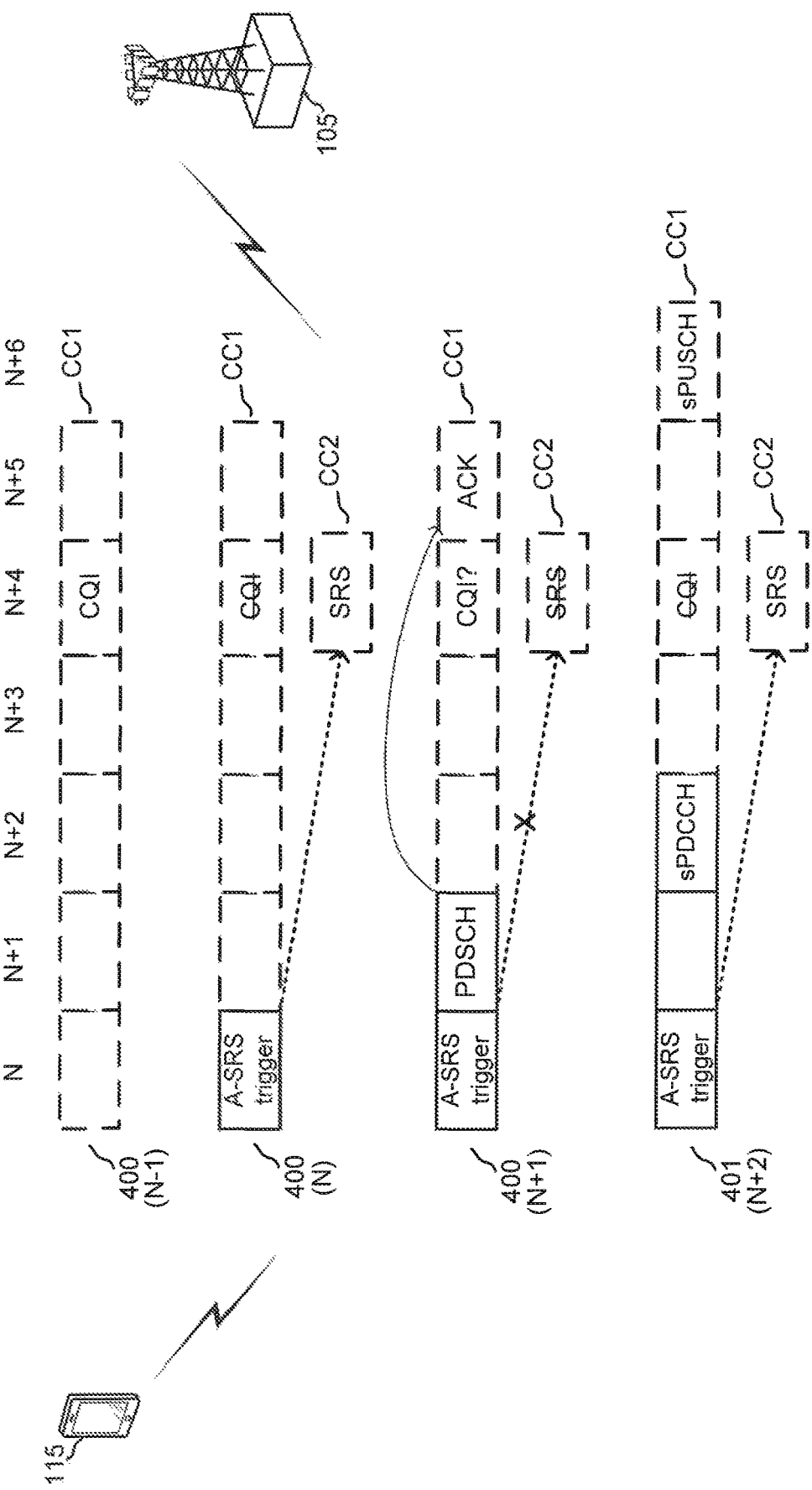
FIG. 4 is a block diagram illustrating a UE and base station configured for SRS carrier switching according to one aspect of the present disclosure.

FIG. 4 is a block diagram illustrating a UE 115 and base station 105 configured for SRS carrier switching according to one aspect of the present disclosure. The transmission of SRS in subframe N+4 may depend on the transmitted information in subframe N+5. As noted above in equation (1), one example priority rule provides that CQI<SRS<HARQ-ACK. If UE has HARQ-ACK scheduled for subframe N+5, it only has 2 ms (minus any timing advance (TA)) to determine whether to transmit CQI, which is reduced with respect to legacy timeline.

It should be noted that the examples described with respect to FIG. 4 refer to CQI as the lower priority transmission. However, the scope of the various aspects of the present disclosure may cover the general case of a "lower priority transmission" that is not planned to be transmitted in subframe N+4 due to an initial trigger for SRS carrier switching until a higher priority transmission arrives in subframe N+5.

FIG. 4 illustrates a transmission stream 400 between UE 115 and base station 105 at three different time points. At N-1, UE 115 identifies that it has CQI scheduled for transmission at N+4 on the first carrier, CC1. At N, UE 115 receives an aperiodic SRS trigger to perform SRS carrier switching to CC2 for transmission of SRS. In comparing priorities of the two colliding signals, SRS has priority over CQI. Therefore, UE 115 drops CQI at N+4 on CC1 to retune to CC2 for transmitting SRS. At N+1, UE 115 receives a downlink data via PDSCH, which would trigger an acknowledgement signal (ACK) to be transmitted at N+5. UE 115 determines the priority between the SRS scheduled for N+4 and ACK scheduled for N+5. Because HARQ-ACK has priority over SRS, and, after tuning away to CC2, there would be insufficient time to transmit both SRS on CC2 at N+4 and then retune to CC1 for transmission of ACK. Therefore, UE 115 drops transmission of SRS at N+4. With four subframes between the PDSCH and the scheduled ACK, UE 115 would have sufficient time to retune to CC1 for transmission.

After dropping the SRS transmission at N+4, UE 115 may determine whether or not it may also transmit the CQI at N+4 on CC1 instead, as originally scheduled. In a first optional aspect, in the baseline behavior, where UE 115 operates on CC1 with a standard-length TTI, the lower priority transmission should not be transmitted even if UE 115 has not tuned to CC2. For the UE operating in sTTI mode, given the additional (and faster) UE processing, UE 115 may be able to transmit the sTTI transmission (e.g., PUSCH at N+4), but not any other transmission.

Transmission stream 401 is an alternate transmission between UE 115 and base station 105. The SRS trigger received at N prompts UE 115 to drop CQI transmission at N+4 on CC1 to retune to CC2 for SRS transmission. At N+2, UE 115 receives an sTTI grant via sPDCCH granting sPUSCH transmissions at N+6. However, at N+2, UE 115 has already tuned to CC2. In this case, the transmission of sPUSCH may depend on the separation between the SRS and the sPUSCH. For example, if SRS is in the last symbol of the subframe and sPUSCH is right before that, UE 115 may not have time to re-configure the RF to come back to the source cell at CC1. However, where SRS is at N+4 and sPUSCH is at N+6, UE 115 may have enough time to tune back to CC1 for sPUSCH transmission.

In an additional aspect illustrated by FIG. 4, if UE 115 is operating in a sPT mode for CC1 of transmission stream 400, and the "higher priority transmission" (e.g., ACK at N+5) is processed using normal processing time (e.g., PDSCH scheduled from a CSS on a PCell), UE 115 may be able to transmit the CQI N+4 in addition to the ACK in N+5. This is for the case when DCI processing is performed assuming a worst case (e.g., the case where the UE has less time to process it according to sPT).

In a further additional aspect illustrated by FIG. 4, UE 115 has the capability of processing the DCI faster, thus, processing and transmitting with an N+3 timing should not be a problem. In such case, UE 115 may transmit the CQI in subframe N+4 after dropping the SRS in response to the data transmission at N+1 that prompts an ACK at N+5 in CC1. Such transmission may depend on the current timing advance (TA) and scheduling signal. UE 115 may transmit the CQI in subframe N+4 when the TA is below a threshold (e.g., 200 μs, 300 μs, etc.). For a TA above that threshold, UE 115 would drop transmission of the CQI. Additionally, transmission of the CQI by UE 115 in subframe N+4 can also depend on whether the "higher priority transmission" is scheduled based on PDCCH or EPDCCH. For PDCCH scheduling, UE 115 may transmit the CQI, while for EPDCCH scheduling, because it covers an entire subframe, UE 115 may drop transmission of the CQI at N+4.

Some UEs may be able to perform faster DCI processing and/or prepare two hypotheses in parallel (e.g. prepare the SRS and the CQI transmission) without the need to support sPT. Thus, such UEs, such as UE 115 for this example aspect, may transmit CQI when the current TA meets the threshold and the higher priority transmission is scheduled based on PDCCH. However, UE 115 does not necessarily have sPT capabilities, but may support a look-ahead procedure as a separate capability.

Figure 5:
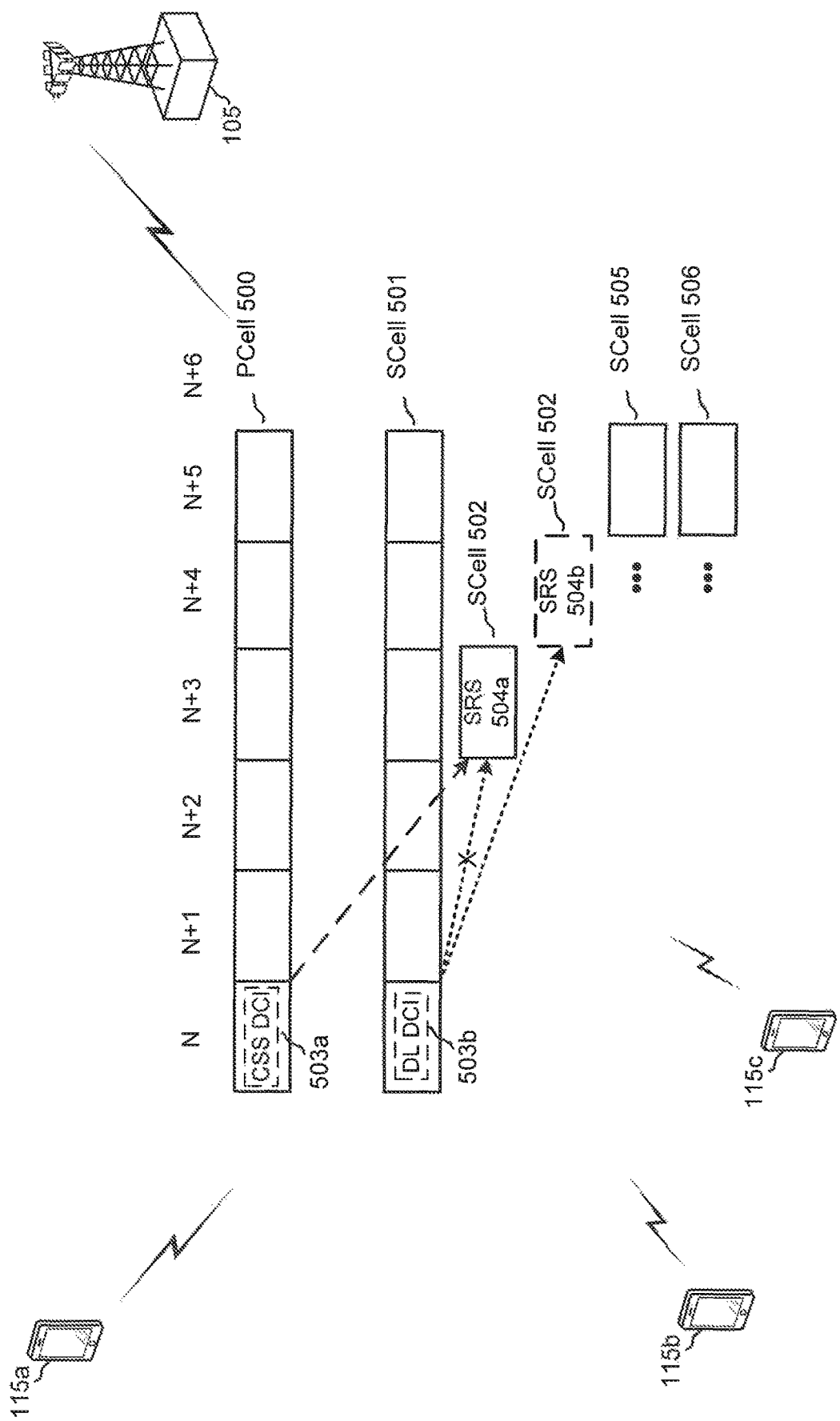
FIG. 5 is a block diagram illustrating UEs and base station configured according to one aspect of the present disclosure.

FIG. 5 is a block diagram illustrating UEs 115a-115c and base station 105 configured according to one aspect of the present disclosure. In current LTE networks, there are generally two ways to trigger SRS carrier switching: (1) transmitting a trigger signal in the common search space (CSS) of a PCell, such as PCell 500, and (2) transmitting the trigger signal on an SRS-SCell (an SCell with a downlink-only configuration), such as SCell 501. Triggering from SCell 501 may further tighten the UE timeline when sPT is configured due to having to perform RF retuning and RF preparation. In the presently described example aspect, there is a separate capability on whether UE 115a supports triggering SRS carrier switching from SCell 501 when configured with sPT.

In a first example aspect, UE 115a may support SRS carrier switching, but the switching cannot be triggered by sPT trigger in SCell 501. While an SRS trigger at CSS DCI 503 of subframe N may properly trigger UE 115a to retune to SCell 502 for SRS 504a transmission, the SRS trigger at DL DCI 503b would not be valid for UE 115a. Alternatively, if SRS triggering from DL DCI 503b is supported, the timeline may follow N+4 (legacy timing) instead of N+3. Thus, in the alternative example, DL DCI 503b may cause UE 115a to retune to SCell 502 for SRS 504b transmission at N+4.

In SRS SCells (without PUSCH/PUCCH configured), such as SCells 501, 502, 505, 506, when sPT/sTTI is configured for downlink, a question arises as to whether the uplink channel also shares the sPT/sTTI configuration. In a first alternative aspect, sPT/sTTI configuration may be automatically linked between downlink and uplink channels, such that when sPT/sTTI is configured for the downlink, sPT/sTTI related to HARQ/scheduling timing is also applicable to the uplink. In a second alternative aspect, sPT/sTTI may be separately configured for downlink and uplink, such that UE 115a timing can be further configured for SRS triggering based on sPT/sTTI or legacy 1 ms N+4 timing.

In an additional aspect of the present disclosure, the SRS trigger in CSS DCI 503a may provide a group downlink control as well as power control commands. For either case, different CCs for the same UE and/or for different UEs may have the same or different timing to apply the SRS triggering or power control commands. Thus, there may be the same or different timing configurations for UEs 115a-115c and for SCells 501, 502, 505, and 506. In a first example aspect, the group control does not allow different timings in the same group control. Thus, even though UEs 115a-115c and SCells 501, 502, 505, and 506 may have different timing configurations, the group control command at CSS DCI 503a identifies the same timing configuration (e.g., regular N+4 or short N+3). In a second alternative aspect, when different timing configurations are in the same group, a common timing may be assumed at least for some CCs for a given UE. For example, UE 115b is capable of simultaneous SRS transmissions on SCell 502 with N+3 and SCell 505 with N+4, if triggered for both SCells 502 and 505. In such an instance, UE 115b can start SRS transmission at N+4 for both SCells 502 and 505.

In a third alternative aspect, different timing configurations may be applied separately, but with the shorter timing configurations having a higher priority. For example, SCell 505 is configured with N+3, while SCell 506 is configured with N+4. When UE 115c is triggered simultaneously for SRS carrier switching, SRS for SCell 505 is transmitted first, as it has priority over SRS transmissions for SCell 506 with an N+4 timing configuration. Such prioritization can be implemented using explicit rules or signaled semi-statically using RRC configuration (e.g., base station 105 can configure the SCells having shorter timing configurations with a lower cell index, where the lower cell index CCs take precedence).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a user equipment (UE), a sounding reference signal (SRS) trigger for SRS carrier switching from a first carrier to a downlink-configured second carrier for an SRS transmission at a designated subframe;
determining, by the UE, whether there are any additional signals scheduled for the UE to transmit on the first carrier that overlap with the SRS transmission;
resolving, by the UE in response to detection of a first additional signal scheduled on the designated subframe, a collision between the SRS transmission and the first additional signal to identify a first scheduled transmission for the designated subframe, wherein the first additional signal includes a non-SRS signal, and wherein the resolving the collision includes:
determining, by the UE, one or more of a transmission time interval (TTI) length and a processing time configured for each of the SRS transmission and the first additional signal, or an acknowledgement reporting schedule associated with the first carrier;
transmitting, by the UE, one or more of the SRS transmission or the first additional signal according to results of the resolving;
determining a time difference between a first scheduled transmission time of the first scheduled transmission and a second scheduled transmission time of a second additional signal; and
transmitting the first scheduled transmission in response to the time difference exceeding a minimum threshold time.

2. The method of claim 1, wherein the resolving the collision further includes:
selecting, by the UE, one of the SRS transmission or the first additional signal as the first scheduled transmission according to a priority rule, wherein the priority rule is based at least in part on one or more of the acknowledgement reporting schedule, the TTI length, or the processing time.

3. The method of claim 2, wherein the priority rule includes prioritizing short TTI transmissions over regular TTI transmissions, and prioritizing scheduled acknowledgement transmissions over short TTI transmission, and further prioritizing according to a signal type priority.

4. The method of claim 3, wherein the signal type priority includes prioritizing acknowledgement signals over SRS and prioritizing SRS over channel quality reporting.

5. The method of claim 1, wherein the resolving the collision includes:
determining, by the UE, that the first additional signal is classified as high reliability data; and
selecting, by the UE, the first scheduled transmission according to a priority rule.

6. The method of claim 5, wherein the selecting includes:
selecting the high reliability data as the first scheduled transmission.

7. The method of claim 1, wherein the determining includes determining, by the UE, the transmission time interval (TTI) length configured for one or more of the first scheduled transmission or a second additional signal.

8. The method of claim 7, wherein the resolving the transmission priority when the TTI length is a regular TTI further includes one of:
resolving the transmission priority in favor of the first scheduled transmission, in response to the first scheduled transmission being prioritized over the second additional signal; or
resolving the transmission priority in favor of the second additional signal, in response to the second additional signal being prioritized over the first scheduled transmission.

9. The method of claim 7, wherein the resolving the transmission priority when the TTI length is a short TTI further includes:
resolving the transmission priority in favor of the second additional signal, in response to the second additional signal being prioritized over the first scheduled transmission, wherein the transmitting includes transmitting the second additional signal.

10. The method of claim 1, further including:
determining, by the UE, whether there are any additional signals scheduled for the UE to transmit on the first carrier at a subsequent subframe adjacent to the designated subframe;
resolving, by the UE in response to detection of a second additional signal scheduled on the subsequent subframe, a transmission priority between the first scheduled transmission and the second additional signal, wherein the transmitting includes transmitting one or more of the SRS transmission, the first additional signal, or the second additional signal according to the results.

11. The method of claim 1, wherein the determining includes determining, by the UE, a processing time mode configured for one or more of the first scheduled transmission or a second additional signal, and wherein the resolving the transmission priority includes identifying the second additional signal having priority over the first scheduled transmission, the method further including:
determining a time difference between a first scheduled transmission time of the first scheduled transmission and a second scheduled transmission time of the second additional signal; and
in response to the first scheduled transmission being configured for a short processing time, one of:
transmitting the first scheduled transmission in response to the time difference exceeding a minimum threshold time; or
refraining from transmission of the first scheduled transmission in response to the time difference being within the minimum threshold time.

12. The method of claim 1, wherein the determining includes determining, by the UE, a processing time mode configured for one or more of the first scheduled transmission or a second additional signal, wherein the UE has capabilities for short processing time, and wherein the resolving the transmission priority includes identifying that the second additional signal having priority over the first scheduled transmission, the method further including:

transmitting, by the UE, the first scheduled transmission in response to a timing advance value within a threshold timing advance time.

13. The method of claim 12, wherein the transmitting the first scheduled transmission is further in response to the second additional signal being scheduled via a physical downlink control channel (PDCCH).

14. The method of claim 12, further including:
reporting, by the UE, a set of capabilities to a serving base station, wherein the set of capabilities includes one or more of:
a short transmission time interval (TTI) mode;
a short processing time mode; or
a mode for the determining whether there are any additional signals scheduled for the UE.

15. The method of claim 1, wherein the receiving the SRS trigger includes one of:
receiving the SRS trigger in a common search space of a primary cell (PCell) in communication with the UE; or
receiving the SRS trigger in a downlink configured secondary cell (SCell).

16. The method of claim 15, further including:
reporting, by the UE having a short processing time mode, an SRS triggering capability to a serving base station, wherein the SRS triggering capability includes one of:
support of SRS carrier switching only with the SRS trigger via the common search space of the PCell; or
support of SRS carrier switching using a legacy processing time with the SRS trigger via either the common search space of the PCell or the downlink configured SCell.

17. The method of claim 16, wherein the short processing time mode and a short transmission time interval (TTI) mode of the UE is configured for downlink in the downlink configured second carrier, the method further including one of:
automatically linking, by the UE, the short processing time mode and short TTI mode for the downlink in the downlink-configured second carrier to an uplink in the downlink-configured second carrier; or
configuring, by the UE, a processing time capability and a TTI capability of the uplink in the downlink-configured second carrier separately from the downlink configuration.

18. The method of claim 1, wherein one or more of the SRS trigger or a power control command are received via a group downlink control signal for a group of UEs including the UE, wherein each UE of the group of UEs and each component carrier of the plurality of component carriers allocated for each UE includes separately configured timing capabilities, wherein the separately configured timing capabilities include processing time capabilities and transmission time interval (TTI) capabilities.

19. The method of claim 18, wherein the group downlink control signal identifies one of:
a single timing configuration for the group of UEs and the plurality of component carriers regardless of the separately configured timing capabilities; or
a plurality of timing configurations associated with the separately configured timing capabilities of the group of UEs and the plurality of component carriers.

20. The method of claim 19, wherein the plurality of timing configurations identifies one of:
a common timing configuration associated with a highest timing configuration of a set of component carriers scheduled for transmission; or
the common timing configuration associated with a prioritized set of component carriers scheduled for transmission, wherein the plurality of component carriers are prioritized according to lower timing configurations of the separately configured timing capabilities.

21. An apparatus configured for wireless communication, the apparatus comprising:
at least one processor; and
a memory coupled to the at least one processor,
wherein the at least one processor is configured to cause the apparatus:
to receive, by a user equipment (UE), a sounding reference signal (SRS) trigger for SRS carrier switching from a first carrier to a downlink-configured second carrier for an SRS transmission at a designated subframe;
to determine, by the UE, whether there are any additional signals scheduled for the UE to transmit on the first carrier that overlap with the SRS transmission;
to resolve, by the UE in response to detection of a first additional signal scheduled on the designated subframe, a collision between the SRS transmission and the first additional signal to identify a first scheduled transmission for the designated subframe, wherein the first additional signal includes non-SRS, wherein the configuration of the at least one processor to resolve the collision includes configuration of the at least one processor:
determine, by the UE, one or more of a transmission time interval (TTI) length and a processing time configured for each of the SRS transmission and the first additional signal, or an acknowledgement reporting schedule associated with the first carrier;
to transmit, by the UE, one or more of the SRS transmission or the first additional signal according to results of the resolving;
to determine a time difference between a first scheduled transmission time of the first scheduled transmission and a second scheduled transmission time of the second additional signal; and
to refrain from transmission of the first scheduled transmission in response to the time difference being within the minimum threshold time.

22. The apparatus of claim 21, wherein the configuration of the at least one processor to resolve the collision includes configuration of the at least one processor:
to select, by the UE, one of the SRS transmission or the first additional signal as the first scheduled transmission according to a priority rule, wherein the priority rule is based at least in part on one or more of the acknowledgement reporting schedule, the TTI length, or the processing time.

23. The apparatus of claim 22, further including configuration of the at least one processor:
to determine, by the UE, whether there are any additional signals scheduled for the UE to transmit on the first carrier at a subsequent subframe adjacent to the designated subframe;
to resolve, by the UE in response to detection of a second additional signal scheduled on the subsequent subframe, a transmission priority between the first scheduled transmission and the second additional signal, wherein the configuration of the at least one processor to transmit includes configuration of the at least one processor to transmit one or more of the SRS transmission, the first additional signal, or the second additional signal according to the results.

24. The apparatus of claim 21, wherein the configuration of the at least one processor to resolve the collision includes configuration of the at least one processor:
- to determine, by the UE, that the first additional signal is classified as high reliability data; and
- to select, by the UE, the first scheduled transmission according to a priority rule.

25. The method of claim 21, wherein the determining includes determining, by the UE, the transmission time interval (TTI) length configured for one or more of the first scheduled transmission or a second additional signal.

26. The method of claim 25, wherein the resolving the transmission priority when the TTI length is a regular TTI further includes one of:
- resolving the transmission priority in favor of the first scheduled transmission, in response to the first scheduled transmission being prioritized over the second additional signal; or
- resolving the transmission priority in favor of the second additional signal, in response to the second additional signal being prioritized over the first scheduled transmission.

27. The method of claim 25, wherein the resolving the transmission priority when the TTI length is a short TTI further includes:
- resolving the transmission priority in favor of the second additional signal, in response to the second additional signal being prioritized over the first scheduled transmission, wherein the transmitting includes transmitting the second additional signal.

28. The apparatus of claim 21, wherein the configuration of the at least one processor to determine includes configuration of the at least one processor to determine, by the UE, a processing time mode configured for one or more of the first scheduled transmission or the second additional signal, and wherein the configuration of the at least one processor resolve the transmission priority identifies the second additional signal having priority over the first scheduled transmission, the apparatus further including configuration of the at least one processor:
- to determine a time difference between a first scheduled transmission time of the first scheduled transmission and a second scheduled transmission time of the second additional signal; and
- executable in response to the first scheduled transmission being configured for a short processing time, to one of:
  - transmit the first scheduled transmission in response to the time difference exceeding a minimum threshold time; or
  - refrain from transmission of the first scheduled transmission in response to the time difference being within the minimum threshold time.

* * * * *